July 7, 1925.
F. E. CLARKE
SHOCK ABSORBER
Filed July 17, 1924
1,544,888
Fig.1.
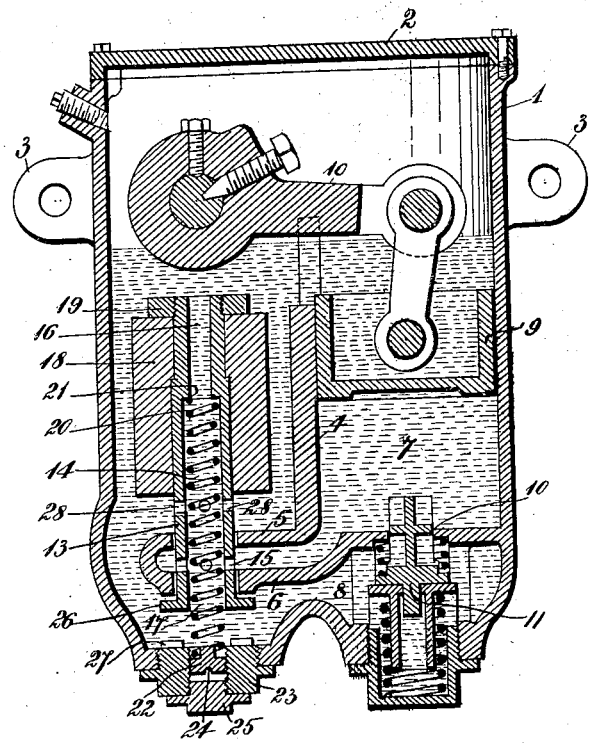
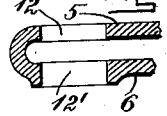
Fig.2.
INVENTOR=
Frederick E. Clarke
By Crale + Hayes
ATTORNEYS=

Patented July 7, 1925.

UNITED STATES PATENT OFFICE.

1,544,888

FREDERICK E. CLARKE, OF SOMERVILLE, MASSACHUSETTS, ASSIGNOR TO JAMES S. LANG, OF WATERTOWN, MASSACHUSETTS.

SHOCK ABSORBER.

Application filed July 17, 1924. Serial No. 726,515.

*To all whom it may concern:*

Be it known that I, FREDERICK E. CLARKE, of Somerville, in the county of Middlesex and State of Massachusetts, a citizen of the United States, have invented a new and useful Improvement in Shock Absorbers, of which the following is a full, clear, and exact description, reference being had to the accompanying drawings, forming a part of this specification, in explaining its nature.

The present invention belongs to that class of shock absorbers which are especially adapted for motor vehicles and in which the force required to pass a fluid through a restricted opening is utilized to prevent excessive vibration or rebound. More particularly the invention relates to an improvement in that type of shock absorbers illustrated in Letters Patent of the United States granted to James S. Lang, No. 1,448,131, dated March 13, 1923 and No. 1,492,329, dated April 29, 1924, and other patents of James S. Lang pertaining to the same subject-matter.

The invention comprises an improvement in the valvular control for the restricted opening in the shock absorber through which a contained fluid is passed.

The object of the invention is to simplify the construction and make more facile the operation of the valve.

The invention can best be seen and understood by reference to the drawings in which—

Figure 1 is a vertical cross section of a shock absorber embodying the invention, such portion only of the absorber being shown as is necessary for a proper understanding of the invention.

Fig. 2 is a cross section of a detail of construction.

Referring to the drawings:—

1 represents a casing having a removable cover 2. Projecting laterally from the casing are lugs or ears 3 by which it may be secured to the body or framework of the vehicle.

On the inside the casing is provided with various members or partitions 4, 5 and 6, respectively, which provide within it a compression chamber 7 and outside this chamber a secondary or expansion chamber 8 with openings between the two chambers, certain of the partitions assisting in the valvular control of said openings.

The casing forms a receptacle for oil contained within its respective chambers. The compression chamber 7 is within a cylinder formed by the cooperation of the wall or partition 4 with the walls of the casing. Contained to reciprocate within the cylinder is a piston 9. The piston is connected by flexible mechanism 10 and other mechanism (not shown) illustrated in the patents above referred to, with the axle of the vehicle.

With the casing secured to the body of the vehicle and the piston connected to its axle, any change in the relative positions of the axle and vehicle body will act to move the piston 9 which is raised or lowered in the cylinder.

Owing to the manner of controlling the passage of oil between the compression chamber and the secondary chamber the piston is controlled to move upwardly within the compression chamber or cylinder with a relatively free movement, but its action is impeded or restrained when moved in a reverse direction. To this end communication between the compression and expansion chambers comprises an inlet opening 10 into the compression chamber from the secondary or expansion chamber. This opening is controlled by a valve 11 which permits a free flow of oil from the secondary chamber into the cylinder when the piston is raised, but prevents a free passage of oil through the opening 10 when the piston moves in a reverse direction. The particular type of valve shown is like that illustrated in Letters Patent of the United States granted James S. Lang, No. 1,492,332, dated April 20, 1924. There is also provided an outlet from the compression chamber into the secondary chamber. This outlet is by way of openings 12 and 12' formed within the partitions 5 and 6, respectively. The openings are oppositely arranged and receive with a sliding fit a cylindrical valve 13, the bore of the partitions 5 and 6 around the openings 12, 12' therein forming a valve seat. It is this valve to which the invention essentially pertains, and to which special reference will now be made.

The valve 13 is provided with a hollow interior or space 14 forming a passageway for the transmission of fluid between the compression chamber and the secondary chamber. Communication between the compression chamber and the space 14 inside the valve is provided by way of ports 15 cut through the wall of the valve at points intermediate the ends thereof and in that portion of the valve normally contained to lie between the partitions 5 and 6 of the casing when the valve is occupying an open position. Communication between the space 14 of the valve and the secondary chamber is by way of ports 16 and 17 at the top and bottom open ends, respectively, of the valve.

The upper end of the valve is shouldered to receive a weight 18 fastened to the valve by means of a lock nut 19.

The valve is supported by a spring 20 extending upwardly through the open bottom end of the valve and through the hollow interior thereof with bearing against a shoulder 21 on the interior of the valve body, the upper end of the opening or passage through the valve being contracted to form this shoulder.

The spring is supported by the lower end thereof resting upon an adjustable spring support 22 which is threaded to fit and be adjustable in a boring formed within a plug 23 which closes an opening within the casing below the valve and through which opening the valve is inserted within the casing. The adjustment of the spring support 22 is secured by a slot 24 within it by which it may be turned. That portion of the boring in the plug 23 below the spring support is closed by an auxiliary plug 25 which prevents the escape of any oil which might leak past the spring support.

The valve and its attached weight supported in a state of substantial balance upon the spring 20 is free to move in a vertical direction in response to such forces as may be brought to bear upon it. A stop to limit the upward movement of the valve after it has passed its full open position is provided by a shoulder 26 on the valve at the lower end thereof which contacts with the under side of the partition 7 acting as a stop. A stop to limit the downward movement of the valve after it has passed its closed position is provided by the lower end surface of the valve contacting with a stop 27 on the upper end surface of the plug 23.

The general operation is as follows: The normal position of the valve, or, in other words, the valve when unaffected by other forces, takes its position as shown in Fig. 1 in a state of substantial balance upon its supporting spring 20 with all the ports 15 of the valve open and with the shoulder 26 lightly pressing against the under surface of partition 6 or, if desired and as indicated in the drawings, occupying a position just out of contact with the under side of the partition 6. Assuming now that a flow of fluid takes place from the compression chamber 7 through the openings 12, 12' to the secondary chamber, this being brought about by a difference of pressures in chambers 7 and 8, resulting from a movement of the piston 9, at such time the fluid discharged from the compression chamber will enter the valve ports 15 and by dividing paths in the cavity 14 of the valve find its exit to the secondary chamber by way of ports 16 and 17 at the opposite ends of the valve. As previously noted, the opening through the valve at the upper end thereof from which exits the port 16 is more contracted than the lower end of the opening from which exits the port 17, and accordingly in order that the valve may be unaffected by the flow of fluid through it the opening through the upper end of the valve is supplemented by additional ports 28. Thus the port 16 supplemented by ports 28 is substantially equal in area to that of port 17 with the result that the reactive effect of the flow of fluid through the various ports is neutralized and the valve is unaffected by the flow of fluid through it and the substantial suspensional balance of the valve will be maintained.

The valve 13 and its attached weight 18 may be considered as one with reference to the effect of their inertia. If the valve be depressed from its normal position the spring 20 will be compressed and upon release will return to its original position as the inertia of the valve and attached weight is overcome by the spring. Likewise if the absorber casing 1 carrying the partitions 5 and 6 and spring support 22 is suddenly raised the inertia of the weighted valve due to its considerable mass will tend to cause it to lag behind the rise of the casing compressing the spring 20 and resulting in a relative movement between the casing and valve which closes the ports 15. If the upward movement of the casing is not continued the compressed spring 20 will in turn overcome the inertia of the weighted valve which will return to its original position reopening the ports 15.

These operations attend various movements of the vehicle body in connection with which the absorber is used and result in the prevention of excessive vibration or rebound thereof as pointed out in detail in the patents of James S. Lang previously referred to.

Having thus fully described my invention, I claim and desire to secure by Letters Patent of the United States:—

1. In a fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet, a piston attachable to the other of said parts and reciprocable in said pressure chamber, a hollow weighted valve controlling said outlet, said valve having a valve cavity with openings into and out of said cavity arranged whereby fluid from out of the pressure chamber when compressed by the piston will be directed to enter and pass through said valve in opposite directions when the valve is open, one of the openings from the cavity of the valve being in the lower end thereof, a spring extending through said opening in the lower end of the valve into the cavity of the valve for yieldingly supporting the valve in a normally open position, and means for supporting the spring.

2. In a fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet, a piston attachable to the other of said parts and reciprocable in said pressure chamber, a hollow weighted valve controlling said outlet, said valve having a valve cavity with openings into and out of said cavity arranged whereby fluid from out of the pressure chamber when compressed by the piston will be directed to enter and pass through said valve in opposite directions when the valve is open, the openings out of the valve cavity comprising openings through the opposite ends of the valve, and means for supporting said valve in a normally open position.

3. In a fluid check shock absorber for controlling the movement of relatively movable parts comprising an element attachable to one of said parts and having a pressure chamber, said element being provided also with means permitting of the circulation of a fluid into and out of said chamber and consisting in part of a controllable outlet, a piston attachable to the other of said parts and reciprocable in said pressure chamber, a hollow weighted valve controlling said outlet, said valve having a valve cavity with openings into and out of said cavity arranged whereby fluid from out of the pressure chamber when compressed by the piston will be directed to enter and pass through said valve in opposite directions when the valve is open, said valve having also a shoulder within the cavity thereof, a spring extending through the lower end of the valve into the cavity thereof with bearing against said shoulder for yieldingly supporting the valve in a normally open position, and means for supporting the spring.

FREDERICK E. CLARKE.